No. 870,389. PATENTED NOV. 5, 1907.
G. H. SHOEMAKER.
WELL TUBE STRAINER.
APPLICATION FILED OCT. 13, 1905.
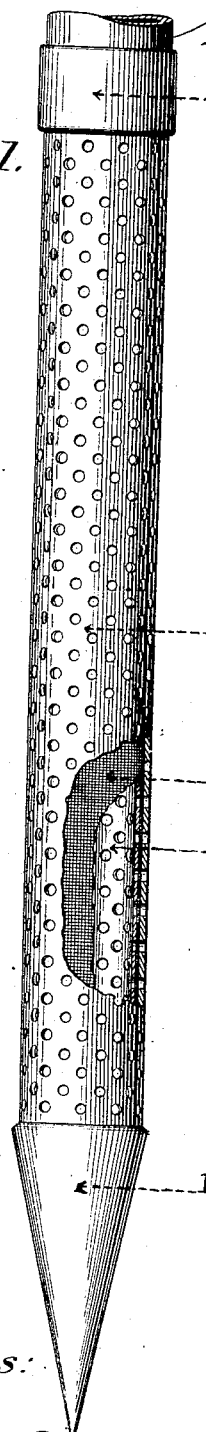
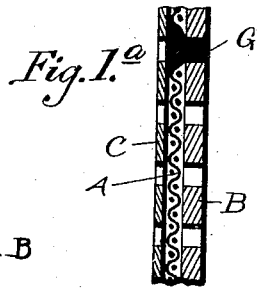
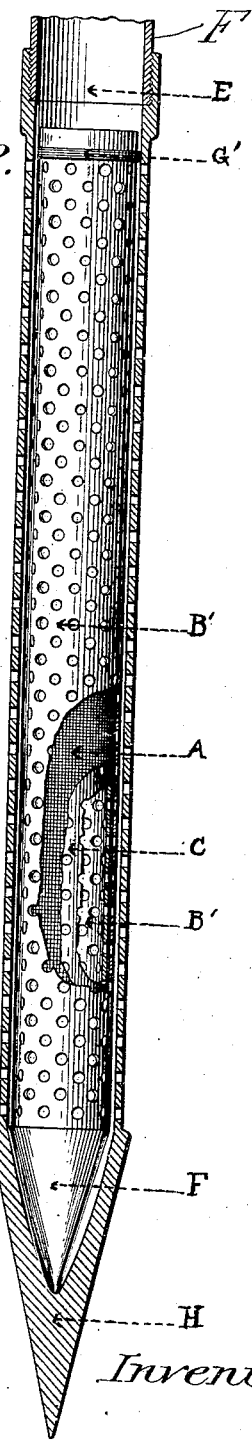

UNITED STATES PATENT OFFICE.

GEORGE HOWARD SHOEMAKER, OF BENTON TOWNSHIP, BERRIEN COUNTY, MICHIGAN.

WELL-TUBE STRAINER.

No. 870,389.  Specification of Letters Patent.  Patented Nov. 5, 1907.

Application filed October 13, 1905. Serial No. 282,687.

*To all whom it may concern:*

Be it known that I, GEORGE HOWARD SHOEMAKER, a citizen of the United States, and resident of Benton township, in the county of Berrien, in the State of Michigan, (model and preliminary application 220,468C and 203,507C having been submitted from South Bend, in the county of St. Joseph, in the State of Indiana,) have invented a new and useful Well-Tube Strainer, of which the following is a specification.

My invention relates to well tube strainers—*i. e.*, devices for permitting water to enter well tubes while preventing the entry of sand, gravel and similar substance; and it consists in the peculiar and advantageous well tube strainer hereinafter described and specifically defined in the claims appended.

In the accompanying drawings which are made a part hereof: Figure 1 is a view, partly in elevation and partly in section, of a well tube strainer constituting one embodiment of my invention. Fig. 1$^a$ is a detail section on an enlarged scale showing the specific manner in which I prefer to fixedly connect the screen of reticulated material to the outer foraminated tube of the strainer. Fig. 2 is a view similar to Fig. 1.

Referring by letter to the said drawings and more particularly to Figs 1 and 1$^a$ thereof: F is a tube or pipe such as are employed in drive or tubular wells, and B is the outer, foraminated tube of my novel strainer. The said tube B is provided at its lower end with the usual point D, and at its upper end is coupled, as indicated by E, to the lower end of the tube or pipe F.

In addition to the outer, foraminated tube B my novel strainer comprises a tubular screen A, of reticulated material, arranged close against the inner side of the tube B, and an inner foraminated tube C, preferably of brass, arranged against the inner side of said tubular screen A. The tubular screen A is fastened with solder on the inside at the top and bottom and at various intervals along the strainer through holes to keep the screen in place. One of these latter connections is illustrated in Fig. 1$^a$ in which G is a mass of solder or analogous material extending through an aperture of the foraminated tube B and fixed at its inner end in the interstices of the tubular screen A. This mode of connection, as will be readily appreciated, may be quickly effected and may be depended on to hold the tubular screen A close against the inner side of the outer foraminated tube B as well as against endwise movement with respect thereto. The latter is due to the fact that the plurality of solder connections G are disposed at right angles to the length of the tubular screen A and are securely fixed at their inner ends in the interstices of said tubular screen.

The office of the inner foraminated tube C is to keep the tubular screen A out against the foraminated tube B; and it may be secured in position by frictional contact with the said tubular screen or by any other means compatible with the purpose of my invention.

By virtue of the construction of my novel strainer it will be seen that there is no liability of the tubular screen A being torn or otherwise injured during the driving of the strainer through fine sand, gravel or rocks; also, that it renders it feasible to provide the outer tube B with a large number of closely arranged, small apertures, which prevents sand packing close to the screen and in that way increases the efficiency of the strainer.

The strainer shown in Fig. 2 is similar to that shown in Figs. 1 and 1$^a$ with the exception that it is smaller in diameter, has no shoulder at the upper end of its point F$^1$, and is provided on the upper portion of its outer foraminated tube B$^1$ with a rubber or lead ring G$^1$. This type of strainer is designed more particularly to be dropped inside the old type of strainer indicated by H when the latter is torn or otherwise impaired; the ring G$^1$ serving when this is done to prevent sand from working past the outer side of the upper portion of the strainer. While preferable the point F$^1$ is not essential to the embodiment shown in Fig. 2, and it may, therefore, be omitted when desired without affecting my invention.

Having described my invention, what I claim and desire to secure by Letters Patent is:

1. In a well tube strainer, the combination of an outer foraminated tube, an inner foraminated tube contained in the outer tube, a tubular screen of reticulated material interposed between and arranged close against the outer and inner foraminated tubes, and a solder connection occupying one of the openings in the outer tube and extending inward at a right angle therefrom and fastened of itself at its inner end in the interstices of the tubular screen, for the purpose set forth.

2. In a well tube strainer, the combination of an outer foraminated tube, an inner foraminated tube contained in the outer tube, a tubular screen of reticulated material interposed between and arranged close against the outer and inner foraminated tubes, a solder connection occupying one of the openings in the outer tube and extending inward at a right angle therefrom and fastened of itself at its inner end in the interstices of the tubular screen, and a packing ring fixed on the outer side of the upper portion of the outer foraminated tube, for the purpose set forth.

GEORGE HOWARD SHOEMAKER.

Witnesses:
MILLARD A. SEITZ,
FRANCIS M. THORP.